(12) United States Patent
Lu et al.

(10) Patent No.: US 12,101,119 B2
(45) Date of Patent: Sep. 24, 2024

(54) MODULATED RETRO REFLECTOR-BASED SATELLITE NETWORK COMMUNICATION SYSTEM AND METHOD

(71) Applicant: TECHNOLOGY AND ENGINEERING CENTER FOR SPACE UTILIZATION, CHINESE ACADEMY OF SCIENCES, Beijing (CN)

(72) Inventors: Lu Lu, Beijing (CN); Pengfei Shen, Beijing (CN); Yanmei Jia, Beijing (CN); Congmin Lv, Beijing (CN)

(73) Assignee: TECHNOLOGY AND ENGINEERING CENTER FOR SPACE UTILIZATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/561,747

(22) PCT Filed: Dec. 27, 2022

(86) PCT No.: PCT/CN2022/142135
§ 371 (c)(1),
(2) Date: Nov. 17, 2023

(87) PCT Pub. No.: WO2023/173883
PCT Pub. Date: Sep. 21, 2023

(65) Prior Publication Data
US 2024/0235681 A1   Jul. 11, 2024

(30) Foreign Application Priority Data
Mar. 16, 2022 (CN) .......... 202210259467.2

(51) Int. Cl.
*H04B 10/00* (2013.01)
*H04B 7/185* (2006.01)
*H04B 10/118* (2013.01)

(52) U.S. Cl.
CPC ....... *H04B 10/118* (2013.01); *H04B 7/18521* (2013.01)

(58) Field of Classification Search
CPC . H04B 10/118; H04B 10/112; H04B 10/1123; H04B 10/1125; H04B 10/1127;
(Continued)

(56) References Cited

U.S. PATENT DOCUMENTS 7,224,905 B2 * 5/2007 Ruggiero ........... H04B 10/1121
398/119
7,366,125 B1 4/2008 Elliott
(Continued)

FOREIGN PATENT DOCUMENTS

CN   104270193 A   1/2015
CN   111277329 A   6/2020
(Continued)

OTHER PUBLICATIONS

Jia Yanmei, et al., Design of Modulated Retroreflector Based Intersatellite Laser Communication Systems, Manned Spaceflight, 2021, pp. 754-760, vol. 27, No. 6.
(Continued)

*Primary Examiner* — Hanh Phan
(74) *Attorney, Agent, or Firm* — Bayramoglu Law Offices LLC

(57) ABSTRACT

A modulated retro reflector-based satellite network communication system and method are provided. The system includes: a data acquisition layer configured to acquire data to be acquired, perform integrated analysis on the data to be acquired and send an integrated analysis result to a backbone
(Continued)

network layer; the backbone network layer configured to receive a control instruction sent by a ground station, schedule first satellites based on the control instruction, and send the integrated analysis result to the ground station; and the ground station configured to generate the control instruction, send the control instruction to the backbone network layer, detect the first satellites and the second satellites, and receive the integrated analysis result. Through the system, the SWaP value of the satellite may be greatly reduced, thereby being suitable for communication networking of micro-satellites.

12 Claims, 8 Drawing Sheets

(58) Field of Classification Search
CPC .............. H04B 10/1129; H04B 10/114; H04B 10/1143; H04B 10/1149; H04B 10/116; H04B 10/40; H04B 10/0795
USPC ....... 398/169, 170, 118, 119, 120, 121, 122, 398/123, 124, 125, 126, 127, 128, 129, 398/130, 131, 172, 158, 159, 135, 136, 398/33, 38, 115
See application file for complete search history.

(56) References Cited

U.S. PATENT DOCUMENTS

| | | | |
|---|---|---|---|
| 7,627,255 B2 * | 12/2009 | Toyoshima | H04B 7/18595 398/170 |
| 2007/0127928 A1 * | 6/2007 | Varshneya | H04B 10/2587 398/135 |
| 2017/0324465 A1 | 11/2017 | Sotom et al. | |

FOREIGN PATENT DOCUMENTS

| | | |
|---|---|---|
| CN | 112235035 A | 1/2021 |
| CN | 114629546 A | 6/2022 |
| TW | I735194 B | 8/2021 |

OTHER PUBLICATIONS

Zhang Cheng, et al., Research on a Management Scheme in Multilayer Satellite Networks, Computer Technology and Development, 2015, pp. 1-4,10, vol. 25, No. 7.

Jia Yanmei, et al., Modulated Retro-Reflector-Based Physical-Layer Network Coding for Space Optical Communications, IEEE Access, 2021, pp. 44868-44880, vol. 9.

* cited by examiner

MODULATED RETRO REFLECTOR-BASED SATELLITE NETWORK COMMUNICATION SYSTEM AND METHOD

CROSS REFERENCE TO THE RELATED APPLICATIONS

This application is the national phase entry of International Application No. PCT/CN2022/142135, filed on Dec. 27, 2022, which is based upon and claims priority to Chinese Patent Application No. 202210259467.2, filed on Mar. 16, 2022, the entire contents of which are incorporated herein by reference.

TECHNICAL FIELD

The present invention relates to the field of satellite communication, and in particular to a modulated retro reflector-based satellite network communication system and method.

BACKGROUND

Installation of a complex pointing, acquisition and tracking (PAT) system on each satellite during existing satellite communication results in a larger size, weight and power (SWaP) value, which limits its application in micro-satellite networks. In addition, when using modulated retro reflectors, existing technologies mostly achieve point-to-point data transmission, that is, only achieve data exchange between two points without networking.

SUMMARY

The technical problem to be solved by the present invention is to provide a modulated retro reflector-based satellite network communication system and method.

The technical solutions of the present invention for solving the above technical problem are as follows. A modulated retro reflector-based satellite network communication system includes:

a communication subnet and a ground station, wherein the communication subnet includes a data acquisition layer and a backbone network layer, wherein the data acquisition layer includes a plurality of first satellites, and is configured to acquire data to be acquired through at least one first satellite, perform integrated analysis on the data to be acquired, and send an integrated analysis result to the backbone network layer, and a modulated retro reflector (MRR) is installed on the first satellite;

the backbone network layer includes a plurality of second satellites, and is configured to receive a control instruction sent by the ground station through at least one second satellite, schedule the first satellites based on the control instruction, and send the integrated analysis result to the ground station, and an MRR and a PAT system, or the PAT system are/is installed on the second satellite;

the ground station is configured to generate the control instruction, send the same to the backbone network layer, detect the first satellites and the second satellites, and receive the integrated analysis result.

The present invention has the beneficial effects as follows. In order to enable laser communication on micro-satellites, it needs to reduce an SWaP value. For this purpose, the MRR may be used, which may eliminate one PAT system, so that the satellite's SWaP value is greatly reduced, thereby being suitable for laser communication of micro-satellites. As the MRR can only transmit information passively and it is usually impossible to achieve direct communication between two MRRs, a satellite network architecture is proposed, i.e., the communication subnet, which consists of the backbone network layer and the data acquisition layer. The MRRs are installed on the satellites in the data acquisition layer, cannot communicate directly with one another, but may communicate with one another through other nodes in the network.

Based on the above technical solution, the following improvements may further be made to the present invention.

Further, a networking process for the communication subnet is as follows:

any two or more satellites that allow communication are formed into the communication subnet and a routing table and a polling list are generated, the polling list being saved to the second satellite; and after networking, each of the first satellites is connected to at least one second satellite and a specific connection process is as follows:

according to satellite location information in the routing table, any first satellite is connected to the second satellite which satisfies a first condition: a distance between this second satellite and the first satellite to which the connection is to be confirmed is less than a threshold; and if there is no second satellite satisfying the first condition, according to the satellite location information in the routing table, any first satellite is connected to the second satellite which satisfies a second condition: a distance between this second satellite and the first satellite to which the connection is to be confirmed is minimum.

Further, the networking process for the communication subnet further includes the joining process of a new satellite, which is specifically as follows:

any satellite in the communication subnet receives an access request of the new satellite and updates basic information of the new satellite to the routing table and the polling list to complete the joining of the new satellite; or the communication subnet receives an access request of the new satellite issued by the ground station, and updates the routing table and the polling list according to information of the access request, and any satellite in the communication subnet sends an access signal to the new satellite to complete the joining of the new satellite.

Further, the polling list is specifically configured to:

unify the time when the second satellites send interrogation beams to the first satellites, and within an interrogation time, data interaction is performed between the backbone network layer and the data acquisition layer, and the data interaction satisfies: an interaction time is less than the period of one interrogation time; and the data interaction performed between the backbone network layer and the data acquisition layer includes:

one-way communication of the second satellite to the first satellite, one-way communication of the first satellite to the second satellite, communication between the first satellites and communication between the second satellites.

Further, the one-way communication of the second satellite to the first satellite is specifically as follows:

based on a selected path, the second satellite sends a modulated light signal with information to the first satellite within the interrogation time.

Further, the one-way communication of the first satellite to the second satellite is specifically as follows:

based on a selected path, the second satellite transmits an interrogation beam with unmodulated data to the first satellite and the interrogation beam is received by the modulated retro reflector on the first satellite; the first satellite modulates a specific piece of data with the interrogation beam as request data, and feeds back the request data to the second satellite with the modulated retro reflector; after receiving the request data, the second satellite returns confirmation data and continues to transmit the interrogation beam to the first satellite; after receiving the confirmation data, the first satellite transmits a piece of start data with the interrogation beam and then sends, with the modulated retro reflector, modulated data to be sent; after the data to be sent is sent completely, the first satellite transmits a piece of end data with the interrogation beam; after receiving the end data, the second satellite sends confirmation end data to the first satellite; and after receiving a feedback from the first satellite confirming that the data has been ended, the second satellite stops transmitting the interrogation beam to the first satellite.

Further, the selected path is specifically as follows:

in a case where one of the first satellites only communicates with one of the second satellites, a path in which the first satellite is communicated with the second satellite is used as the selected path;

in a case where one of the first satellites communicates with the plurality of second satellites:

when the plurality of second satellites transmits interrogation beams non-simultaneously, a path in which the first satellite is communicated with the second satellite corresponding to an order in which the interrogation beams are received is used as the selected path; and when the plurality of second satellites transmits the interrogation beams simultaneously, a path in which the first satellite is communicated with the second satellite corresponding to the beam with the highest energy among the interrogation beams is used as a selected tentative path, a path score of the tentative path is compared with scores of paths in which the first satellite is communicated with the remaining second satellites to determine whether the path score of the tentative path is highest to generate a determination result, if the determination result is yes, the tentative path is used as the selected path, and if the determination result is no, the energy of the interrogation beam of the path with a higher path score than the tentative path is adjusted lower, so that the determination result is yes, and at this time, the tentative path is used as the selected path; and in the case where the plurality of first satellites communicates with one of second satellites:

when only one of the first satellites contains the data to be sent, a path in which the first satellite containing the data to be sent is communicated with the second satellite is used as the selected path;

when there is a plurality of first satellites containing the data to be sent, the second satellite sends confirmation data with a satellite marker to the plurality of first satellites containing the data to be sent, the first satellite that matches the satellite marker communicates with the second satellite, at this time, a path in which the first satellite that matches the satellite marker is communicated with the second satellite is used as the selected path, after the period of one interrogation time ends, the second satellite sends silent data to the first satellite that matches the satellite marker; the process of using the path in which the first satellite that matches the satellite marker is communicated with the second satellite as the selected path is repeated until all the first satellites that contain the data to be sent have communicated with the second satellite.

Another technical solution of the present invention for solving the above technical problem is as follows: a modulated retro reflector-based-satellite network communication method includes:

step 1, by a data acquisition layer, acquiring data to be acquired; performing integrated analysis on the data to be acquired; and sending an integrated analysis result to a backbone network layer;

step 2, by the backbone network layer, sending the integrated analysis result to a ground station or saving the integrated analysis result to the backbone network layer; and step 3, by the backbone network layer, automatically generating a control instruction according to the backbone network layer or receiving instruction data sent by the ground station, and scheduling, by the backbone network layer, the first satellites according to the control instruction or the instruction data.

The present invention has the beneficial effects as follows. In order to enable laser communication on micro-satellites, it needs to reduce an SWaP value. For this purpose, the MRR may be used, which may eliminate one PAT system, so that the satellite's SWaP value is greatly reduced, thereby being suitable for laser communication of the micro-satellites. As the MRR can only transmit information passively and it is usually impossible to achieve direct communication between two MRRs, a satellite network architecture is proposed, i.e., the communication subnet, which consists of the backbone network layer and the data acquisition layer. The MRRs are installed on the satellites in the data acquisition layer, cannot communicate directly with one another, but may communicate with one another through other nodes in the network.

Further, a networking process for the communication subnet is as follows:

any two or more satellites that allow communication are formed into the communication subnet and a routing table and a polling list are generated, the polling list being saved to the second satellite; and after networking, each of the first satellites is connected to at least one second satellite and a specific connection process is as follows:

according to satellite location information in the routing table, any first satellite is connected to the second satellite which satisfies a first condition: a distance between this second satellite and the first satellite to which the connection is to be confirmed is less than a threshold; and if there is no second satellite satisfying the first condition, according to the satellite location information in the routing table, any first satellite is connected to the second satellite which satisfies a second condition: a distance between this second satellite and the first satellite to which the connection is to be confirmed is minimum.

Further, the networking process for the communication subnet further includes the joining process of a new satellite, which is specifically as follows:

any satellite in the communication subnet receives an access request of the new satellite and updates basic information of the new satellite to the routing table and the polling list to complete the joining of the new satellite; or the communication subnet receives an access request of the new satellite issued by the ground station, and updates the routing table and the polling list according to information of the access request, and any satellite in the communication subnet sends an access signal to the new satellite to complete the joining of the new satellite.

Further, the polling list is specifically configured to:

unify the time when the second satellites send interrogation beams to the first satellites, and within an interrogation time, data interaction is performed between the backbone network layer and the data acquisition layer, and the data interaction satisfies: an interaction time is less than the period of one interrogation time; and the data interaction performed between the backbone network layer and the data acquisition layer includes:

one-way communication of the second satellite to the first satellite, one-way communication of the first satellite to the second satellite, communication between the first satellites and communication between the second satellites.

Further, the one-way communication of the second satellite to the first satellite is specifically as follows:

based on a selected path, the second satellite sends a modulated light signal with information to the first satellite within the interrogation time.

Further, the one-way communication of the first satellite to the second satellite is specifically as follows:

based on a selected path, the second satellite transmits an interrogation beam with unmodulated data to the first satellite and the interrogation beam is received by the modulated retro reflector on the first satellite; the first satellite modulates a specific piece of data with the interrogation beam as request data, and feeds back the request data to the second satellite with the modulated retro reflector; after receiving the request data, the second satellite returns confirmation data and continues to transmit the interrogation beam to the first satellite; after receiving the confirmation data, the first satellite transmits a piece of start data with the interrogation beam and then sends, with the modulated retro reflector, modulated data to be sent; after the data to be sent is sent completely, the first satellite transmits a piece of end data with the interrogation beam; after receiving the end data, the second satellite sends confirmation end data to the first satellite; and after receiving a feedback from the first satellite confirming that the data has been ended, the second satellite stops transmitting the interrogation beam to the first satellite.

Further, the selected path is specifically as follows:

in a case where one of the first satellites only communicates with one of the second satellites, a path in which the first satellite is communicated with the second satellite is used as the selected path;

in a case where one of the first satellites communicates with the plurality of second satellites:

when the plurality of second satellites transmits interrogation beams non-simultaneously, a path in which the first satellite is communicated with the second satellite corresponding to an order in which the interrogation beams are received is used as the selected path; and when the plurality of second satellites transmits the interrogation beams simultaneously, a path in which the first satellite is communicated with the second satellite corresponding to the beam with the highest energy among the interrogation beams is used as a selected tentative path, a path score of the tentative path is compared with scores of paths in which the first satellite is communicated with the remaining second satellites to determine whether the path score of the tentative path is highest to generate a determination result, if the determination result is yes, the tentative path is used as the selected path, and if the determination result is no, the energy of the interrogation beam of the path with a higher path score than the tentative path is adjusted lower, so that the determination result is yes, and at this time, the tentative path is used as the selected path; and in the case where the plurality of first satellites communicates with one of second satellites:

when only one first satellite contains the data to be sent, a path in which the first satellite containing the data to be sent is communicated with the second satellite is used as the selected path;

when there is a plurality of first satellites containing the data to be sent, the second satellite sends confirmation data with a satellite marker to the plurality of first satellites containing the data to be sent, the first satellite that matches the satellite marker communicates with the second satellite, at this time, a path in which the first satellite that matches the satellite marker is communicated with the second satellite is used as the selected path, and after the period of one interrogation time ends, the second satellite sends silent data to the first satellite that matches the satellite marker; and the process of using the path in which the first satellite that matches the satellite marker is communicated with the second satellite as the selected path is repeated until all the first satellites that contain the data to be sent have communicated with the second satellite.

Still another technical solution of the present invention for solving the above technical problem is as follows. A storage medium storing instructions therein, wherein when a computer reads the instructions, the computer is caused to execute the modulated retro reflector-based satellite network communication methods as described in any one of the above.

The present invention has the beneficial effects as follows. In order to enable laser communication on micro-satellites, it needs to reduce an SWaP value. For this purpose, the MRR may be used, which may eliminate one PAT system, so that the satellite's SWaP value is greatly reduced, thereby being suitable for laser communication of the micro-satellites. As the MRR can only transmit information passively and it is usually impossible to achieve direct communication between two MRRs, a satellite network architecture is proposed, i.e., the communication subnet, which consists of the backbone network layer and the data acquisition layer. The MRRs are installed on the satellites in the data acquisition layer, cannot communicate directly with one another, but may communicate with one another through other nodes in the network.

Yet still another technical solution of the present invention for solving the above technical problem is as follows: an electronic device including the above storage medium, and a processor that executes the instructions in the above storage medium.

The present invention has the beneficial effects as follows. In order to enable laser communication on micro-satellites, it needs to reduce an SWaP value. For this purpose, the MRR may be used, which may eliminate one PAT system, so that the satellite's SWaP value is greatly reduced, thereby being suitable for laser communication of the micro-satellites. As the MRR can only transmit information passively and it is usually impossible to achieve direct communication between two MRRs, a satellite network architecture is proposed, i.e., the communication subnet, which consists of the backbone network layer and the data acquisition layer. The MRRs are installed on the satellites in the data acquisition layer, cannot communicate directly with one another, but may communicate with one another through other nodes in the network.

Figure 1:
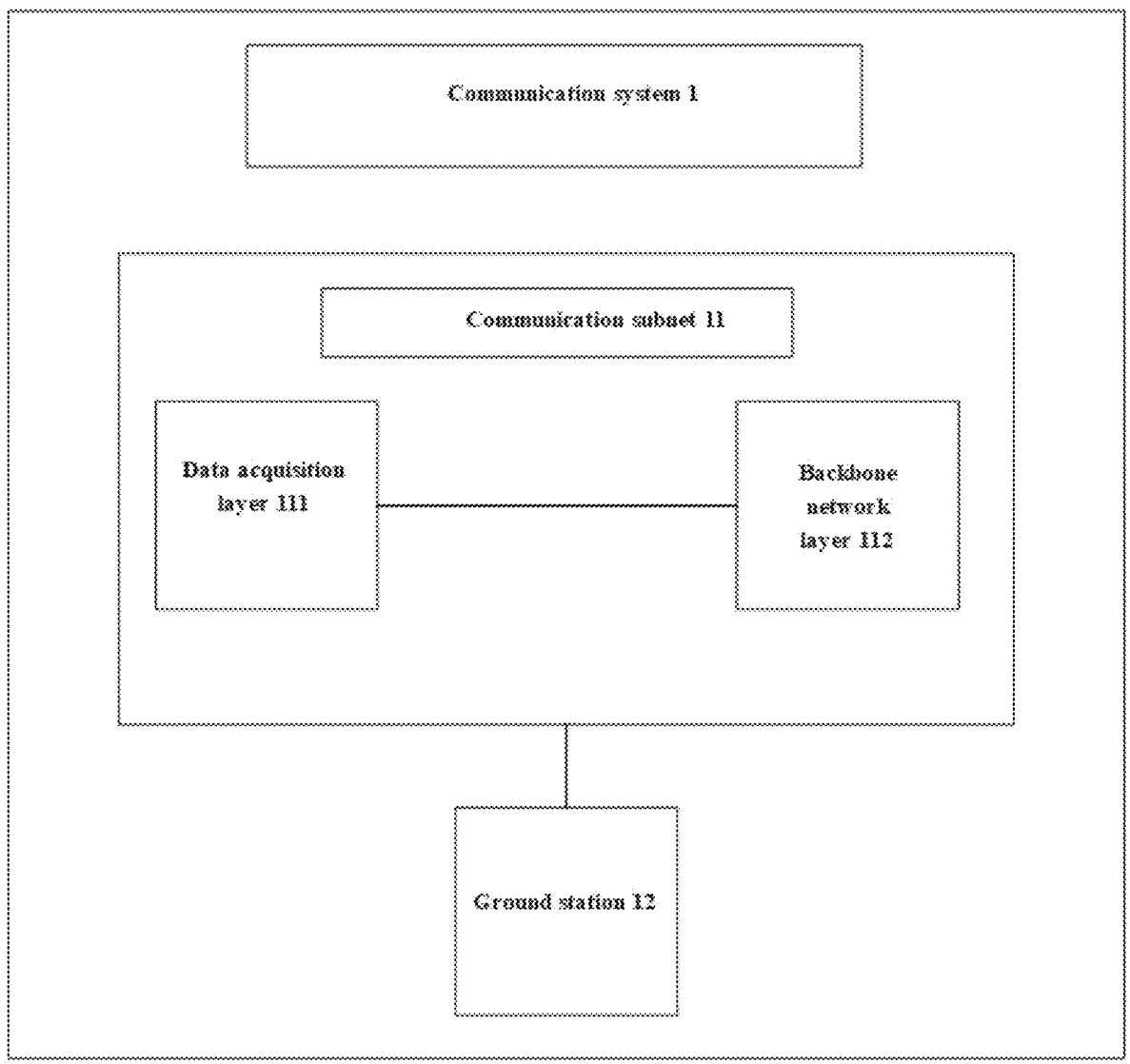
FIG. 1 is a structural block diagram of a modulated retro reflector-based satellite network communication system according to an embodiment of the present invention.

In the accompanying drawings, a list of components represented by respective reference signs is as follows:

1 communication system, 11 communication subnet, 111 data acquisition layer, 112 backbone network layer, and 12 ground station.

DETAILED DESCRIPTION OF THE EMBODIMENTS

The principle and features of the present invention are described below. The examples are given only for explaining the present invention and are not intended to limit the scope of the present invention.

In order to facilitate understanding of the present solution, some of existing terminologies and background in the solution are explained as follows.

Prior to this, it should be understood that in this embodiment, mentioned first satellites are represented by satellites in a data acquisition layer 111 and mentioned second satellites are represented by satellites in a backbone network layer 112.

1. Networking of Micro-Satellites

The micro-satellite formation provides the potential for navigation, communication, remote sensing, scientific research, and the like for both military and civilian purposes, and may be used for gravity mapping, tracking forest fires, finding water sources, etc. It is a key technology of inter-satellite collaboration of small satellites formations to inter-connect multiple small satellites together through an inter-satellite link to form a space communication network with rapid response, information sharing and real-time data exchange, which can effectively and comprehensively utilize information of each satellite. Micro-satellite clusters may provide low-latency, low-cost, high-speed and high-reliability services.

2. Space Laser Communication and Modulated Retro Reflector

Space laser communication has the characteristics of no frequency resource limitation, a wide bandwidth, a high rate and anti-interference, and has become an important way for future inter-satellite and satellite-ground links of small satellites. The micro-satellites require load with low SWaP (Size, Weight and Power) values. The relatively low SWaP value of inter-satellite laser communication is suitable for micro-satellite inter-satellite and satellite-ground data transmission demands. The micro-satellites are interconnected by means of laser communication, and thus a laser communication network may be constructed.

Laser retro-modulation reflection technology is an asymmetric laser communication link, and differs from conventional laser communication in that a modulated retro reflector (MRR) requires Pointing, Acquisition and Tracking (PAT) only on one end and a corner reflector or a modulated reflection system with a cat's eye effect on the other end. The MRR has a lower SWaP value than a conventional laser communication terminal, may provide a higher rate than microwave communication, and has a low requirement on a satellite platform itself. Use of an array of modulated retro reflectors enables point-to-multipoint communication. U.S. Jet Propulsion Laboratory is developing an all-sky coverage inter-satellite omnidirectional optical communicator (ISOC) based on MEMS modulated retro reflectors, which will achieve a data rate of up to 1 Gbps over a distance of 200 km in free space and is suitable for the micro-satellites.

As shown in FIG. 1, an MRR-based satellite network communication system 1 includes a communication subnet 11 and a ground station 12.

The communication subnet 11 includes a data acquisition layer 111 and a backbone network layer 112.

The data acquisition layer 111 includes a plurality of first satellites, and is configured to acquire data to be acquired through at least one of first satellites, perform integrated analysis on the data to be acquired, and send an integrated analysis result to the backbone network layer 112.

An MRR is installed on the first satellite.

The backbone network layer 112 includes a plurality of second satellites, and is configured to receive a control instruction sent by the ground station 12 through at least one of second satellites, schedule the first satellites based on the control instruction, and send the integrated analysis result to the ground station 12.

An MRR and a PAT system or the PAT system are/is installed on the second satellite.

The ground station 12 is configured to generate the control instruction, send the same to the backbone network layer 112, detect the first satellites and the second satellites, and receive the integrated analysis result.

In some possible embodiments, in order to enable laser communication on micro-satellites, it needs to reduce an SWaP value. For this purpose, the MRR may be used, which may eliminate one PAT system and greatly reduce the satellite's SWaP value, thereby being suitable for laser communication of the micro-satellites. As the MRR may only transmit information passively and it is usually impossible to achieve direct communication between two MRRs, a satellite network architecture is proposed, in which the communication subnet 11 is composed of the backbone network layer 112 and the data acquisition layer 111, wherein the MRRs are installed on the satellites in the data acquisition layer 111, and the MRRs cannot communicate directly with one another, but may communicate with one another through other nodes in the network.

Figure 3:
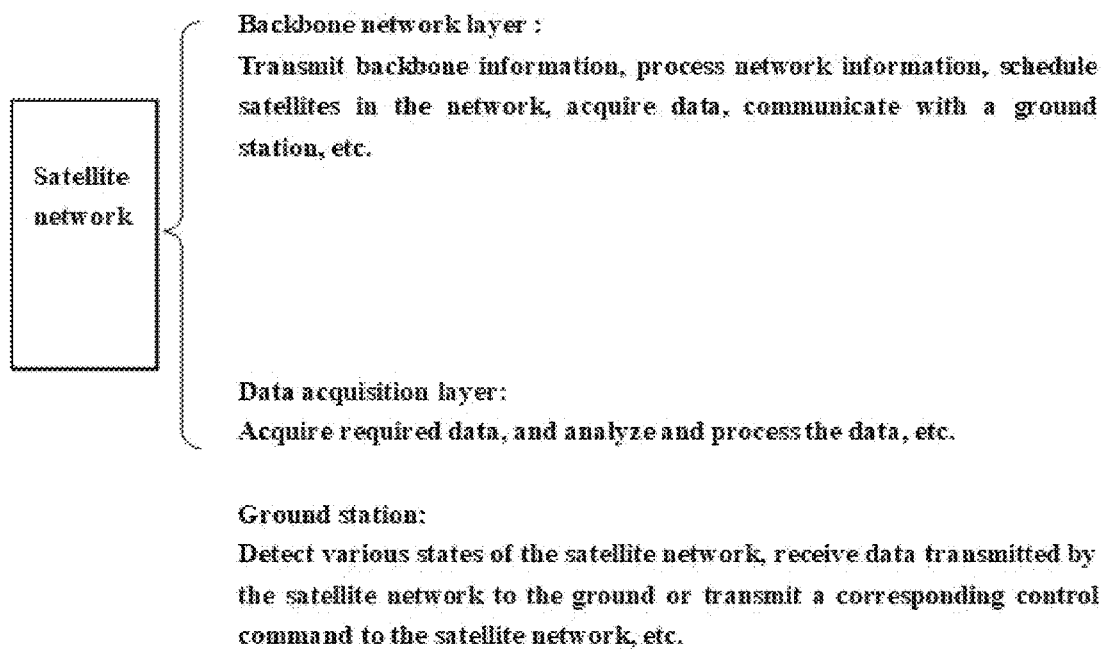
FIG. 3 is a schematic diagram of a satellite network architecture of a modulated retro reflector-based satellite network communication system according to an embodiment of the present invention.

It should be noted that the data to be acquired may include image data or any type of data, and a specific type of the data to be acquired is determined by the function of the satellite. The satellite network architecture, i.e., the communication system 1, is as shown in FIG. 3. The network architecture includes the satellite network, i.e., the communication subnet 11, and the ground station 12. The satellite network consists of the satellite backbone network layer 112 and the data acquisition layer 111. Various nodes in the network communicate with one another through laser.

(1) For the Backbone Network Layer 112

The satellites in the backbone network layer 112 have the functions of backbone information transmission, network information processing, scheduling of satellites in the network, data acquisition, communication with the ground station 12, and so on.

The satellites in the backbone network layer 112 are the same as ordinary satellites that communicate with one another through laser, and each satellite is provided with a transmitter and a receiver and may send data to or receive data from other satellites. In order to be able to send laser with data to other satellites, a PAT system is required to be installed on each satellite in this layer. The satellites in this layer all may communicate with other satellite nodes actively, either sending signal light with data or continuous light with unmodulated data (which is called interrogation light).

Backbone information includes data transmitted in a backbone network. All data transmitted in the backbone network layer 112, such as data sent when the satellites communicate with one another, may be regarded as the backbone information here. A start position of transmission is determined by the satellite. If a satellite wants to transmit data to another satellite, it corresponds to the start position, and the data may be forwarded through other satellites in the network.

Regarding the network information processing, network information is used to represent satellite-related information in the network, such as states of the satellites in the network (such as locations, connection relationships, etc.), routing tables maintained in the satellites, and polling lists (of the satellites in the backbone network layer 112), etc. The topology of the satellite network will constantly change, so it is necessary to continuously adjust information such as the connection relationships between the satellites, the corresponding routing tables, polling lists, and the like according to the network information, i.e., which is the processing of the network information.

The scheduling of the satellites in the network includes: scheduling according to the above network information, including: reconfirming the connection relationships between the satellites, updating the routing tables and the polling lists, etc.

Regarding the data acquisition of the satellites in the network, the data acquired is also different depending on the function of the satellite.

Communication of the satellites in the network with the ground station 12 depends on the specific needs of the network, for example: there is a new satellite in the data acquisition layer needs to access the network; or the satellite network encounters an emergency and needs to be directed by the ground station, etc.

(2) For the Data Acquisition Layer 111

Different from the satellites in the backbone network layer 112, the satellites in the data acquisition layer 111 mainly serve to acquire required data and analyze and process the data. In order to reduce the SWaP value of the satellite, no PAT system is installed on the satellites in this layer. Therefore, the satellites in this layer cannot communicate with other satellites nodes actively and also cannot interconnect with one another, and the data may only be forwarded through the satellites in the backbone network layer 112 as relays.

Receivers for laser communicate are installed on the satellites in the data acquisition layer 111 and are used to receive data sent by the other satellites, such the control instructions sent by the satellites in the backbone network layer 112. In order to send the data acquired by itself and the processed information to other nodes in the network, the MRR is installed on each of the satellites in this layer, which may use the received interrogation light to modulate data and reflect it, thereby transmitting the data. For a specific communication process, see Embodiment 1.

(3) For the Ground Station 12

The ground station 12 is configured to detect various states of the satellite network, and may receive the data transmitted from the satellite network to the ground or transmit corresponding control commands to the satellite network.

It should be noted that detection of the various states mainly includes: detection of the location information of the satellites, presence or absence of abnormal conditions, etc. This patent does not focus on the ground station 12, which may be a ground station 12 of an ordinary satellite network and is not specially limited, as long as the ground station 12 may communicate with the satellite network.

(4) For Establishment of the Network, i.e., the Communication Subnet 11

A. Opening of Network

When two or more satellites may communicate with each other, it is regarded that the network has been established and each node in the network may communicate with other nodes (either directly or by means of routing through other nodes). Information of all satellite nodes, such as locations of the satellites, needs to be recorded in the network and one routing table is maintained in each satellite in the backbone network layer 112 for forwarding the corresponding data. In addition, one polling list needs to be maintained in each satellite in the backbone layer 112 for interrogating the satellites in the data acquisition layer 111 in turn. For an interrogation process, see Embodiment 2.

Once the network is established, it is necessary to determine the state of the connection between the satellites, that is, whether the two satellites may communicate with each other directly. For the satellites in the data acquisition layer 111, since they cannot communicate with one another actively, they must be connected to at least one satellite in the backbone network layer 112 in such a way that according to the satellite location information recorded in the network, the satellite in the data acquisition layer 111 is connected to the satellite in the backbone network layer 112 whose distance to the satellite in the data acquisition layer 111 is less than a certain value; and if the distance between each of all satellites in the backbone network layer 112 and the satellite in the data acquisition layer 111 exceeds this value, one of the satellites in the backbone network layer 112 whose distance to the satellite in the data acquisition layer 111 is minimum is selected to be connected to the satellite in the data acquisition layer 111. In this way, each of satellites in the data acquisition layer 111 is connected to at least one satellite in the backbone network layer 112.

Access/Joining of New Satellite Node

B. A New Satellite Node May Access the Network in Two Ways.

The first way is active access in which the satellite actively sends an access request to a node in the network; after receiving the signal, the network node registers information, such as a location, of the new satellite node in the network, and updates the routing table and the polling list for the corresponding node in the network; and the new satellite node may then communicate with other satellites. The second access way is passive access in which the ground station 12 sends information to the satellite network to inform it of information, such as the location, of a satellite node that needs to newly access, and the network updates the corresponding routing table and polling list; and one node in the network then sends a network access signal to the satellite to complete the joining of the new node. If the newly accessing satellite is in the backbone network layer 112, it may access the network either actively or passively; and if the newly accessing satellite is in the data acquisition layer 111, it may only access the network passively as it cannot actively communicate with other satellites.

C. Network Connection

For the satellites in the backbone network layer 112, the satellites in the network that may communicate with them are nodes connected thereto. For the satellites in the data acquisition layer 111, as no connection exists between them and they may only uses the satellites in the backbone network layer 112 as relays. Therefore, each of all the satellites in the data acquisition layer 111 must be connected to at least one satellite in the backbone network layer 112 in order to send data to other nodes in the network.

D. Network Interrogation

Embodiment 2: since the satellites in the data acquisition layer 111 cannot actively send data, they need to be interrogated by the satellites in the backbone network layer 112. For a specific interrogation process, see Embodiment 3. One polling list needs to be maintained in each satellite in the backbone network layer 112 for interrogating the satellites in the data acquisition layer 111 connected thereto so as to detect whether they need to send data. If the satellite in the backbone network layer 112 is connected to a plurality of satellites in the data acquisition layer 111, it needs to interrogation these satellites in turn.

Figure 4:
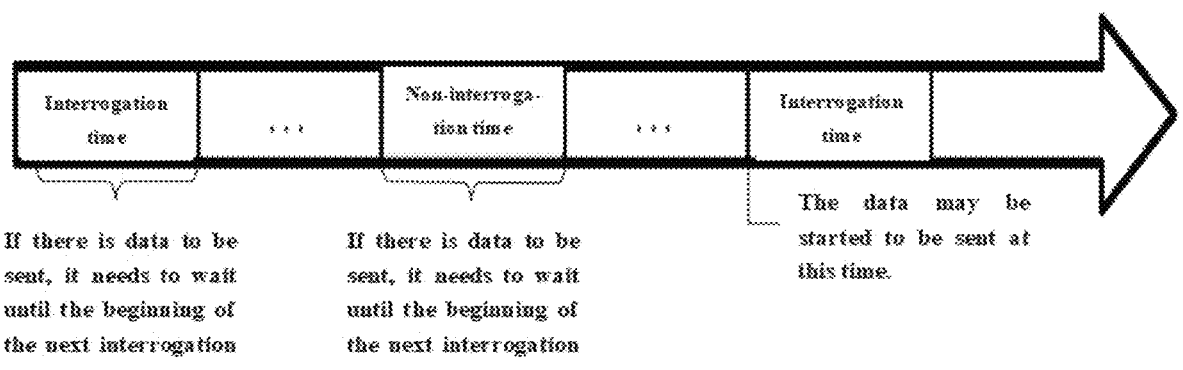
FIG. 4 is a schematic diagram of an interrogation time of a modulated retro reflector-based satellite network communication system according to an embodiment of the present invention.

An interrogation time is defined here, as shown in FIG. 4: a time required for the satellite in the backbone network layer 112 to interrogate one satellite in the data acquisition layer 111. It is stipulated that all interrogation times in the network are equal, that is, the time for each satellite in the backbone network layer 112 to interrogate one satellite in the data acquisition layer 111 is equal. In addition, it is stipulated that the start and end times of each interrogation time are the same. For this purpose, clocks of all satellite nodes in the network needs to be synchronized. The data may be sent using standard access protocols, such as the slotted Aloha protocol. It is stipulated that the satellite in the data acquisition layer 111 may only send corresponding request data at the starting time of interrogation, and may then send the data (see Embodiment 3 for the specific process), and the time for sending the data must be less than one interrogation time; and if there is data to be sent within a interrogation time, it need to wait until the beginning of the next interrogation time. This ensures that the polling process will not be interrupted due to data transmission.

(5) For Network Communication

A. Communication Between Satellites in the Backbone Network Layer 112

Figure 5:
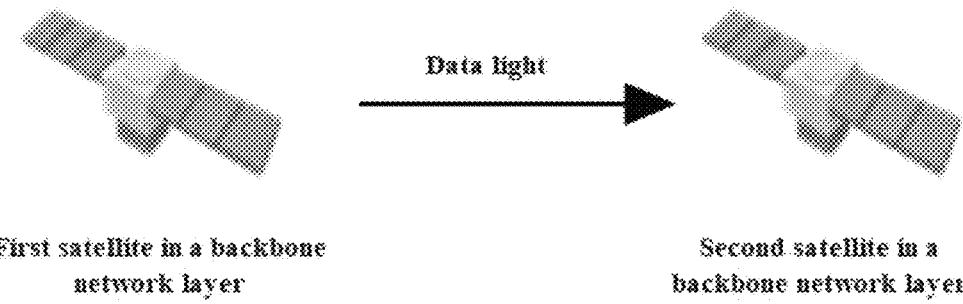
FIG. 5 is a schematic diagram of communication between satellites of a backbone network layer of a modulated retro reflector-based satellite network communication system according to an embodiment of the present invention.

As shown in FIG. 5, since each satellite in the backbone network layer 112 is provided with a transmitter and a receiver as well as a PAT system, when one satellite needs to send data, it may directly use laser to send the data to a receiving end of the another satellite.

B. One-Way Communication from the Satellites in the Backbone Network Layer 112 to the Satellites in the Data Acquisition Layer 111

Figure 6:
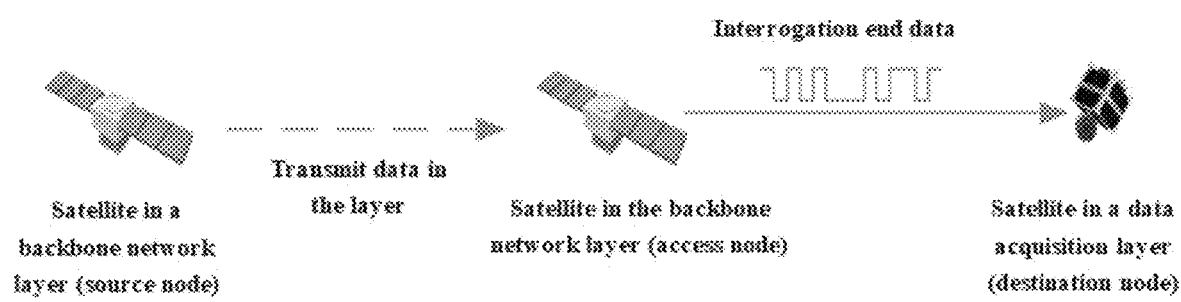
FIG. 6 is a schematic diagram of data transmission from satellites in a backbone network layer to satellites in a data acquisition layer in a modulated retro reflector-based satellite network communication system according to an embodiment of the present invention.

Embodiment 4: as shown in FIG. 6, since the satellite in the backbone network layer 112 is provided with the transmitter and the PAT system and the satellite in the data acquisition layer 111 includes a receiver, if the satellite in the backbone network layer 112 needs to send data, such as a control instruction, to the satellite in the data acquisition layer 111, it may directly send a modulated optical signal with information to a receiving end.

C. One-Way Communication from the Satellites in the Data Acquisition Layer 111 to the Satellites in the Backbone Network Layer 112

Figure 7:
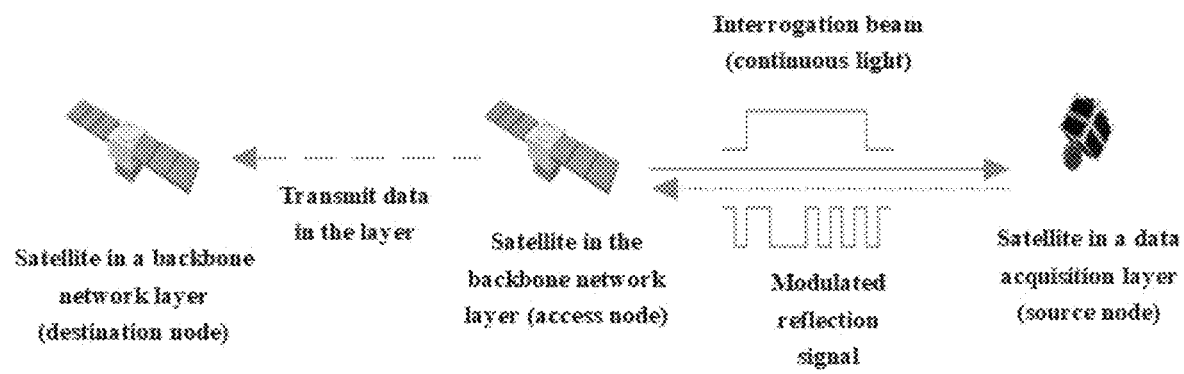
FIG. 7 is a schematic diagram of data transmission from satellites in a data acquisition layer to satellites in a backbone network layer in a modulated retro reflector-based satellite network communication system according to an embodiment of the present invention.

Embodiment 3: as shown in FIG. 7, if the satellite in the data acquisition layer 111 needs to send data to the satellite in the backbone network layer 112, first the satellite in the backbone network layer 112 sends a continuous beam (an interrogation beam) with unmodulated data, to the satellite in the data acquisition layer 111. After reaching the satellite in the data acquisition layer 111, this beam is received by the MRR on the satellite. The MRR may use this continuous beam to modulate the data to be sent thereon, and reflect the modulated data light in a reflection direction parallel to an incident direction of the interrogation light, so that the reflected data light may be transmitted to the satellite in the backbone network layer 112 and received by its receiver, thereby obtaining the data to be transmitted by the satellite in the data acquisition layer 111.

Figure 8:
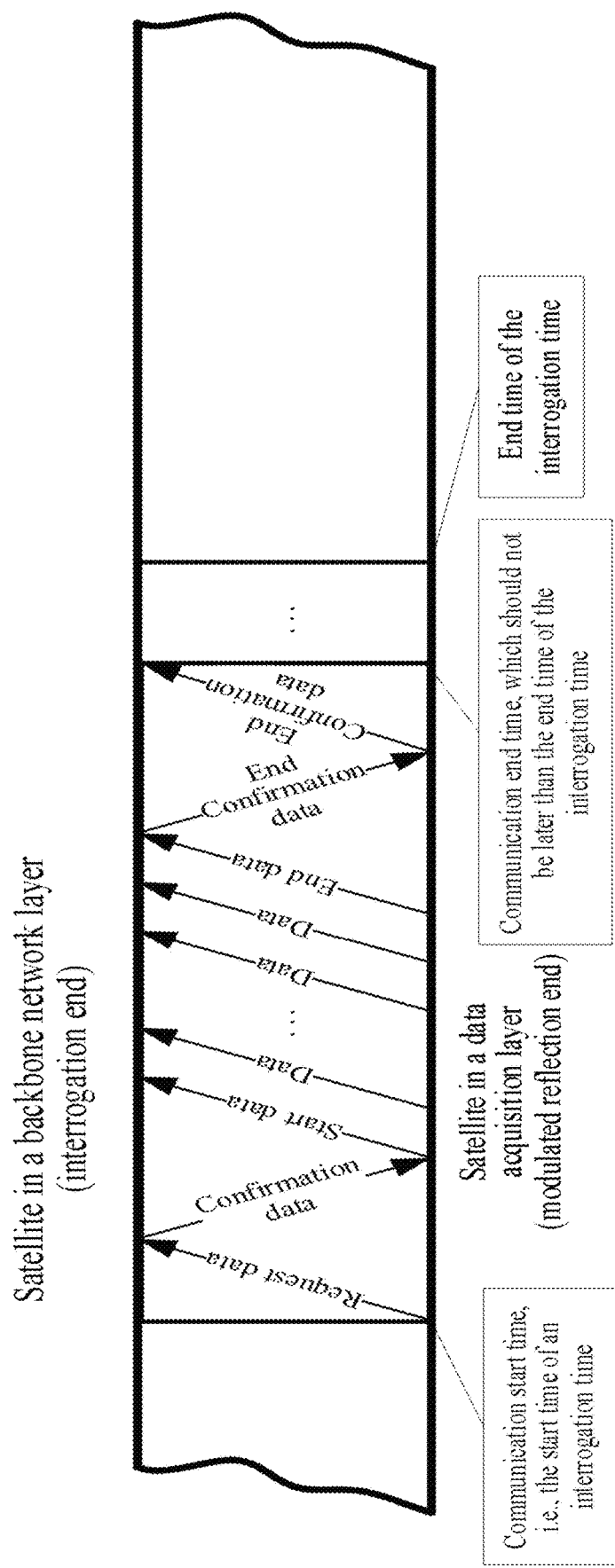
FIG. 8 is a schematic diagram of data communication within the interrogation time in a modulated retro reflector-based satellite network communication system according to an embodiment of the present invention.

Specifically, as shown in FIG. 8, since the satellite in the data acquisition layer 111 cannot communicate actively, in order to know that it needs to send data, the satellite in the backbone network layer 112 needs to interrogate it. The specific process is as follows. The satellite in the backbone network layer 112 sends an interrogation beam to the satellite in the data acquisition layer 111 at intervals. If the satellite in the data acquisition layer 111 does not need to send data, it does not modulate the beam, and the satellite in the backbone network layer 112 will obtain a beam that contains no data. When the satellite in the data acquisition layer 111 needs to transmit data, it first uses the interrogation beam to modulate a specific piece of data as request data and reflects the same back to the satellite in the backbone network layer 112. After receiving the request data, the satellite in the backbone network layer 112, if it agrees to receive the satellite's data, will send confirmation data to the receiving end of the satellite and continuously transmit the interrogation beam. After receiving the confirmation data, the satellite in the data acquisition layer 111 first transmits start data with the interrogation beam to indicate the start position and size of the data, and then modulates the data to be sent on the interrogation beam and reflects it back to the satellite in the backbone network layer 112. After the data is sent completely, the satellite in the data acquisition layer 111 sends another end data. For the satellite in the backbone network layer 112, it first receives the start data from the satellite in the data acquisition layer 111, and according to the data, confirms the location, size and other information of the subsequent received data; after receiving the corresponding data, waits for end data; if the end data is received, it means that the corresponding data has been completely received, and at this time, the satellite in the backbone network layer 112 will send end confirmation data to the satellite in the data acquisition layer 111 again, indicating that the corresponding data has been received. After receiving the end signal, the satellite in the data acquisition layer 111 sends the end confirmation data using the interrogation beam to indicate the end of this data transmission. After receiving the end confirmation data, the satellite in the backbone network layer 112 stops sending the interrogation beam to the satellite in the data acquisition layer 111, and the communication process ends.

D. Communication Between Satellites in the Data Acquisition Layer 111

Figure 9:
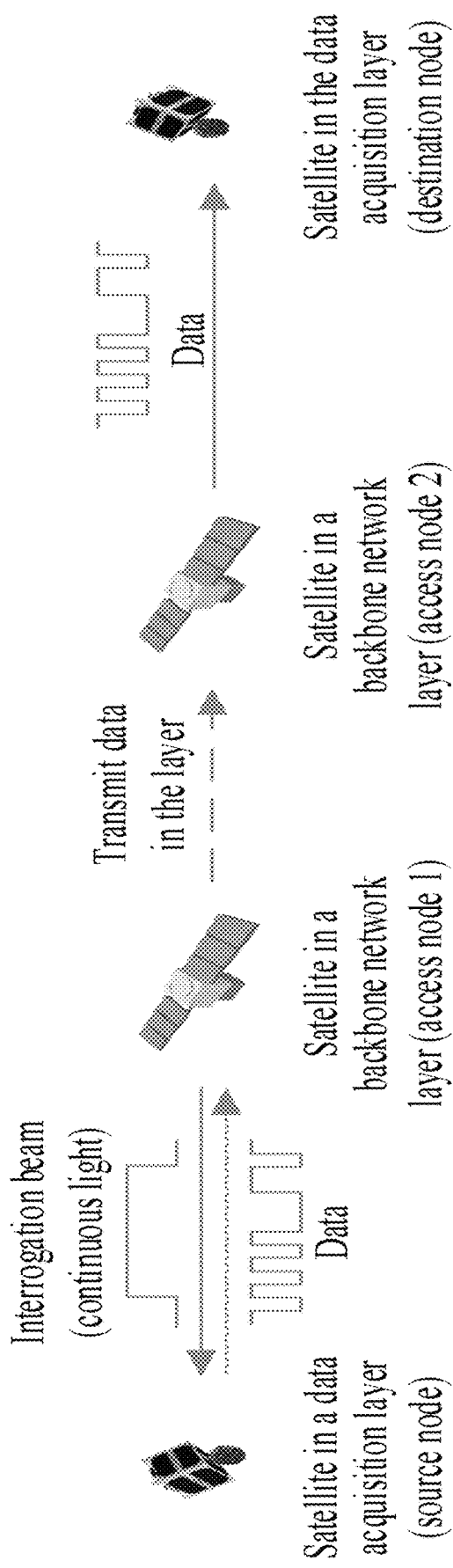
FIG. 9 is a schematic diagram of communication between satellites in a data acquisition layer of a modulated retro reflector-based satellite network communication system according to an embodiment of the present invention.

As shown in FIG. 9, since the satellites in the data acquisition layer 111 cannot communicate actively, communication between them may only use the satellites in the backbone network layer 112 as relays to forward data that needs to be exchanged. First, the satellite in the data acquisition layer 111 at the sending end sends data to the corresponding satellite in the backbone network layer 112. The specific communication process is consistent with "C. one-way communication from the satellites in the data acquisition layer 111 to the satellites in the backbone network layer 112". Then, the data is forwarded to the satellite connected to the receiving end in the backbone network layer 112, and next the satellite in the backbone network layer 112 sends the data to the satellite in the data acquisition layer 111 that needs to receive the data. The specific communication process is consistent with "B. one-way communication from the satellites in the backbone network layer 112 to the satellites in the data acquisition layer 111". In this way, the communication between the satellites in the data acquisition layer 111 is completed.

(6) Network Routing

For the satellites in the backbone network layer 112, routing therebetween may be the same as the routing of ordinary satellite networks. For the satellites in the data acquisition layer 111, their data first need to be sent to the backbone network layer 112. They are connected to the satellites in the backbone network layer 112 in the following ways: a. one satellite in the data acquisition layer 111 is only connected to one satellite in the backbone network layer 112; b. one satellite in the data acquisition layer 111 is connected to a plurality of satellites in the backbone network layer 112; c. a plurality of satellites in the data acquisition layer 111 is connected to one satellite in the backbone network layer 112. These three cases are described below respectively.

A. One Satellite in the Data Acquisition Layer 111 is Only Connected to One Satellite in the Backbone Network Layer 112

In this case, the satellite in the data acquisition layer 111 may only send data to the corresponding satellite in the backbone network layer 112. In this case, the data is only sent at the start time of interrogation; and if there is data to be sent within an interrogation time, it needs to wait until the beginning of the next interrogation time. The related content has been described in Embodiment 2.

B. One Satellite in the Data Acquisition Layer 111 is Connected to a Plurality of Satellites in the Backbone Network Layer 112

Only the case that one satellite in the data acquisition layer 111 is connected to the two satellites in the backbone network layer 112 is described here and this applies to the case that one satellite in the data acquisition layer 111 is connected to more satellites in the backbone network layer 112. Also the data is only sent at the beginning of the interrogation time.

If the two satellites in the backbone network layer 112 make interrogation in different time periods, the satellite in the data acquisition layer 111 may send data respectively in these two different time periods. After reaching the corresponding node in the backbone network layer 112, the data is transmitted to the corresponding destination node (transmission paths are different).

Figure 10:
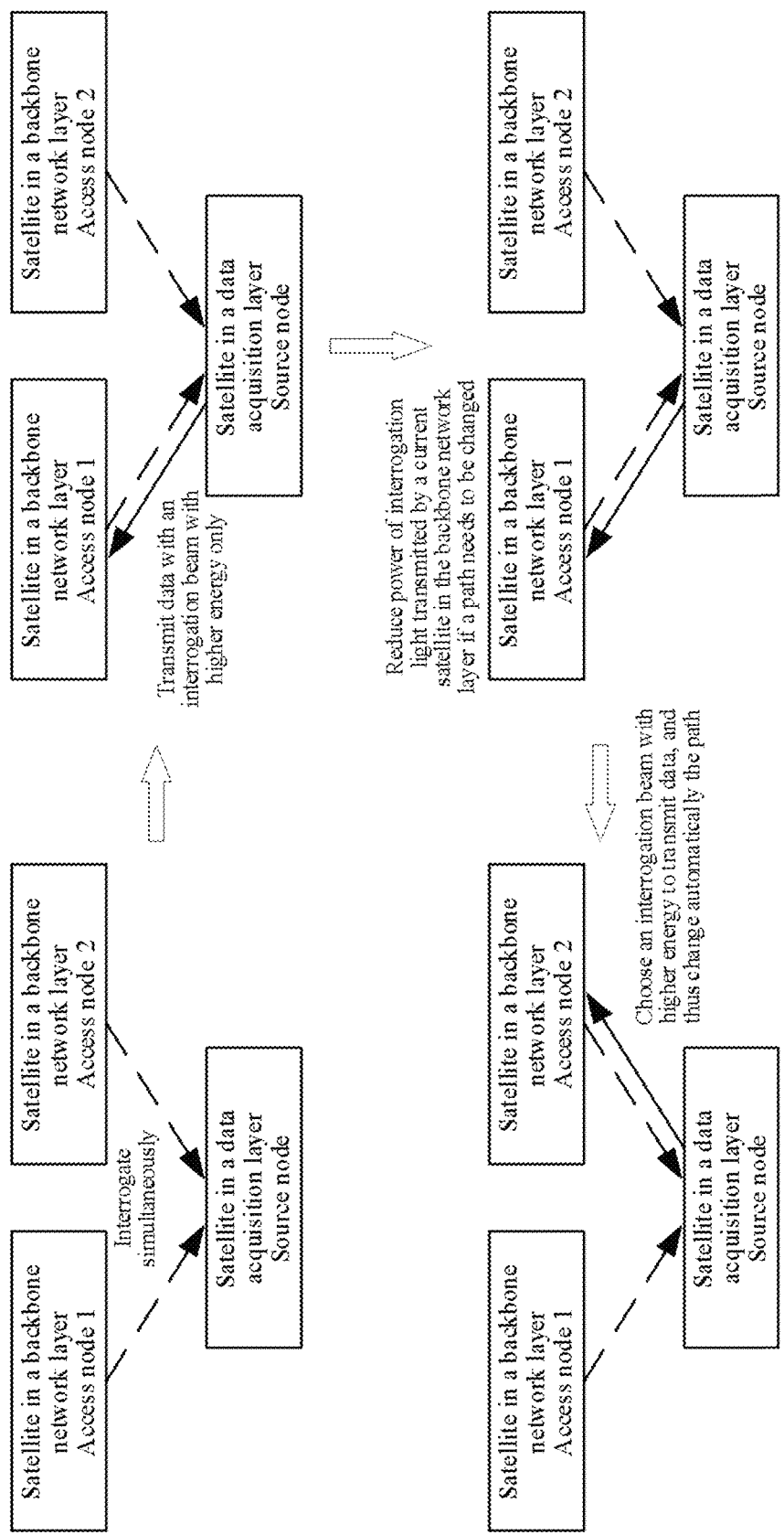
FIG. 10 is a schematic diagram showing that one satellite in a data acquisition layer is connected to a plurality of satellites in a backbone network layer in a modulated retro reflector-based satellite network communication system according to an embodiment of the present invention.

As shown in FIG. 10, if the two satellites in the backbone network layer 112 interrogate the satellite in the data acquisition layer 111 simultaneously, the satellite in the data acquisition layer 111 first sends request data to both satellites, and after receiving the request data, the two satellites in the backbone network layer 112 transmit confirmation data to the satellite in the data acquisition layer 111 and simultaneously transmit continuous interrogation light (see Embodiment 3). At this time, the satellite in the data acquisition layer 111 may choose any link therein to transmit data. Here, priority is given to the link with stronger interrogation beam energy to transmit data (this link has better quality). As there are two satellites in the backbone network layer 112 for interrogation, there are two different paths (from the node in the data acquisition layer 111 to the destination node), which may differ from each other in performance (such as number of path points, link performance, etc.). When the data reaches the corresponding node in the backbone network layer 112, the network analyzes the optimal transmission path (which refers to a path starting from the node in the data acquisition layer 111) according to the destination node of the data. If the current transmission path is already optimal, keep the state unchanged; and if there is a better path when the data is transmitted from another satellite in the backbone network layer 112, the power of the interrogation beam transmitted by the current satellite in the backbone network layer 112 is reduced until the energy of this interrogation beam received by the satellite in the data acquisition layer 111 is lower than that of the other interrogation beam (whose transmission power is unchanged). In this way, the satellite in the data acquisition layer 111 automatically selects a link with higher energy to transmit data, and thus automatically switches to another link to transmit data. When the data transmission is completed, the satellite in the data acquisition layer 111 sends the end data to the two satellites in the backbone network layer 112 at the same time, and then the satellites in the backbone network layer 112 send end confirmation data. Finally, the satellite in the data acquisition layer 111 sends end confirmation data to the two satellites in the backbone network layer 112 simultaneously, indicating that the communication process ends (see Embodiment 3). In this process, the satellite in the data acquisition layer 111 selects the path to the backbone network node only based on the energy of the interrogation beams received, while the selection of an overall transmission path in the network is analyzed in the backbone network and has nothing to do with the data acquisition layer 111, thereby simplifying the calculation process of the data acquisition layer 111.

C. A Plurality of Satellites in the Data Acquisition Layer 111 is Connected to One Satellite in the Backbone Network Layer 112

In this case, the satellite in the backbone network layer 112 polls all the satellites in the data acquisition layer 111 connected thereto. If there is a satellite in the data acquisition layer 111 that needs to send data, it needs to wait until the start time of interrogation.

Figure 11:
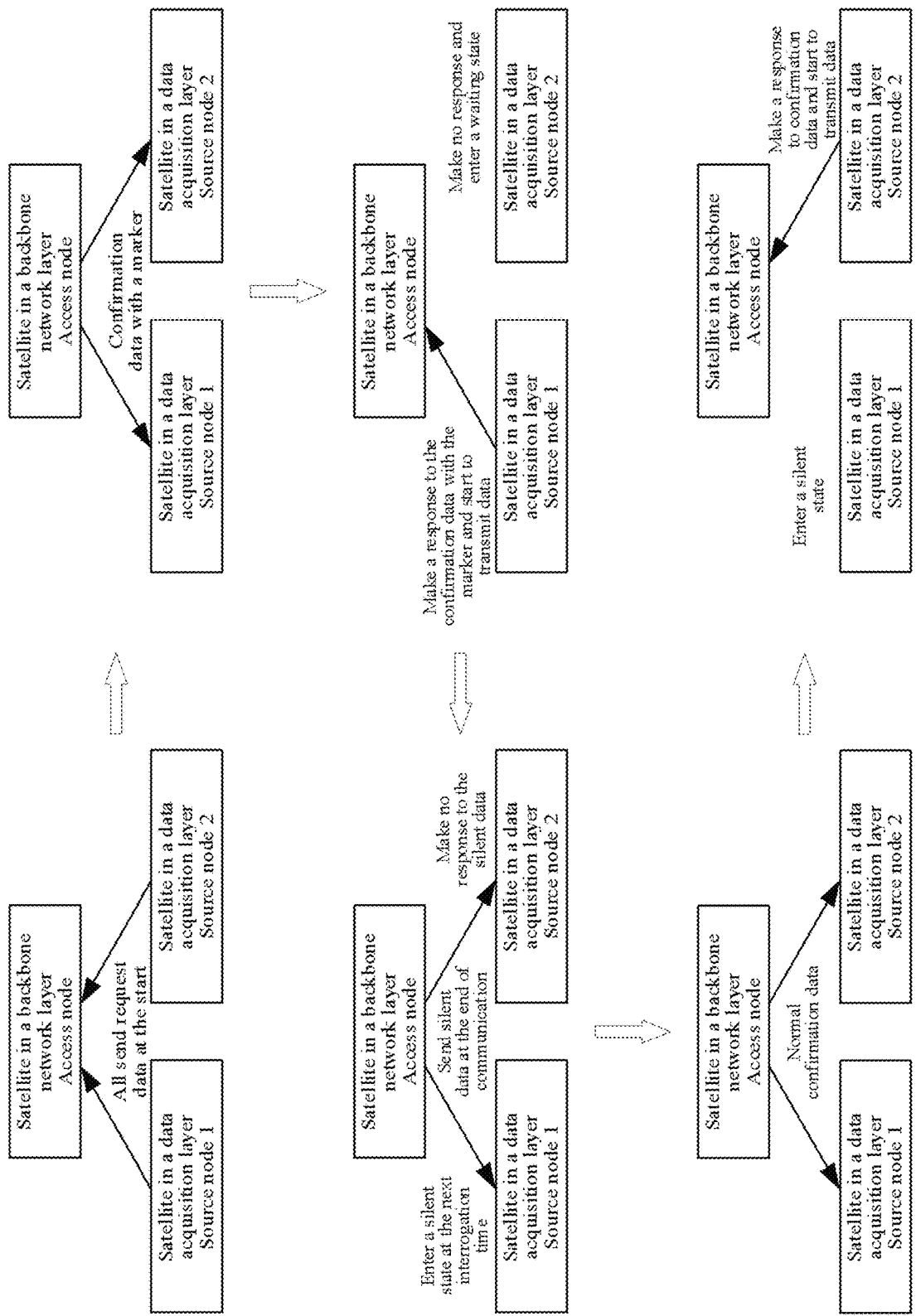
FIG. 11 is a schematic diagram showing that a plurality of satellites in a data acquisition layer is connected to one satellite in a backbone network layer in a modulated retro reflector-based satellite network communication system according to an embodiment of the present invention.

As shown in FIG. 11, if there are two (or more, two is taken as an example here) satellites in the data acquisition layer 111 within an interrogation range of one satellite in the backbone network layer 112 at the same time (for example, these two satellites are relatively close to each other, and illuminated by the interrogation beam at the same time), during interrogation, if there is only one satellite that needs to send data, a normal communication process may be carried out. However, if both satellites need to send data at the beginning of an interrogation time, data conflict may occur (for example, two signals are physically superimposed and their respective data cannot be obtained). In this case, the following measures are taken. First, both satellites send request data to prepare to send data; when the two pieces of request data reach the satellite in the backbone network layer 112, it may be determined that a conflict will occur; in order to prevent confirmation data from being received by both satellites, the confirmation data with a corresponding mark is transmitted here, which has the function identical to that of the confirmation data in Embodiment 3 but with the mark of the corresponding satellite, the mark can only be identified by the corresponding satellite in the data acquisition layer 111, and only the satellite identifying the mark will carry out the subsequent communication process. Here, the confirmation data with the mark transmitted by the satellite in the backbone network layer 112 may be received by both satellites, but only the satellite identifying the mark will continue the communication process, and the other satellite will enter a waiting process (because this is equivalent to the case that it receives no confirmation data). At the end of the interrogation time, the communication process of the first satellite has ended, and the satellite in the backbone network layer 112 sends a special piece of silent data to it, so that after receiving it, the first satellite is forced not to send data within the next interrogation time, and the second satellite will not respond to it. In the next interrogation time, the satellite in the backbone network layer 112 sends ordinary confirmation data, and the second satellite continues the communication process after receiving it (it enters the waiting process as receiving no confirmation data in the first time period), and the first satellite will not respond to it. In this way, the two satellites may send data respectively during two time periods without causing conflicts.

(7) Network Disconnection

When there is a network node needing to be disconnected, it first needs to send a network departure signal to other nodes in the network. After receiving the signal, other satellites delete the corresponding information in the network and send a confirmation departure signal to the satellite node. The satellite node may be disconnected from the network after receiving the confirmation departure signal.

(8) Supplement to the Satellites in the Backbone Network Layer 112

MRRs may also be installed on the satellites in the backbone network layer 112, so that these satellites may communicate actively (with the PAT systems) or passively (with the MRRs, without using the PAT system). The specific communication process and protocol of passive communication adopted by the satellites in the backbone network layer 112 are the same as those described in the previous section. In this way, the satellites in the backbone network layer 112 communicate more flexibly; when the passive communication mode is used, power loss may be reduced. In addition, active communication and passive communication may be performed at the same time, and data may be transmitted to a plurality of satellites at the same time.

Preferably, in any of the above embodiments, a networking process for the communication subnet 11 is specifically as follows.

Any two or more satellites that allow communication are formed into the communication subnet 11 and a routing table and a polling list are generated, the polling list being saved to the second satellite; and after networking, connect all first satellites to at least one second satellite, and a specific connection process is as follows:

according to satellite location information in the routing table, connect any first satellite to the second satellite which satisfies a first condition: a distance between this second satellite and the first satellite to which the connection is to be confirmed is less than a threshold; and if there is no second satellite satisfying the first condition, according to the satellite location information in the routing table, connect any first satellite to a second satellite which satisfies a second condition: a distance between this second satellite and the first satellite to which the connection is to be confirmed is minimum.

Preferably, in any of the above embodiments, the networking process for the communication subnet 11 further includes a joining process of a new satellite, which is specifically as follows:

any satellite in the communication subnet 11 receives an access request of the new satellite and updates basic information of the new satellite to the routing table and the polling list to complete the joining of the new satellite; or the communication subnet 11 receives an access request of the new satellite issued by the ground station 12, and updates the routing table and the polling list according to information of the access request, and any satellite in the communication subnet 11 sends an access signal to the new satellite to complete the joining of the new satellite.

Preferably, in any of the above embodiments, the polling list is specifically used to:

unify the time when the second satellites transmit interrogation beams to the first satellites, and within the interrogation time, data interaction is performed between the backbone network layer 112 and the data acquisition layer 111;

wherein the data interaction satisfies: an interaction time is less than a period of one interrogation time; and the data interaction performed between the backbone network layer 112 and the data acquisition layer 111 includes:

one-way communication from the second satellite to the first satellite, one-way communication from the first satellite to the second satellite, communication between the first satellites and communication between the second satellites.

Preferably, in any of the above embodiments, the one-way communication from the second satellite to the first satellite is specifically as follows:

based on a selected path, the second satellite sends a modulated light signal with information to the first satellite within the interrogation time.

It should be noted that the modulated light signal with the information should be understood as data sent by the second satellite to the first satellite, without limiting what specific data is.

Preferably, in any of the above embodiments, the one-way communication from the first satellite to the second satellite is specifically as follows:

based on a selected path, the second satellite transmits an interrogation beam with unmodulated data to the first satellite and the interrogation beam is received by the modulated retro reflector on the first satellite; the first satellite modulates a specific piece of data with the interrogation beam as request data, and feeds back the request data to the second satellite with the modulated retro reflector; after receiving the request data, the second satellite returns confirmation data and continues to transmit the interrogation beam to the first satellite; after receiving the confirmation data, the first satellite transmits a piece of start data with the interrogation beam and then sends, with the modulated retro reflector, modulated data to be sent; after the data to be sent is sent completely, the first satellite transmits a piece of end data with the interrogation beam; after receiving the end data, the second satellite sends confirmation end data to the first satellite; and after receiving a feedback from the first satellite confirming that the data has been ended, the second satellite stops transmitting the interrogation beam to the first satellite.

It should be noted that the request data mentioned in the present application document should be understood as a string of data with special symbols or fields. After receiving the string of data with the special symbols or fields, a receiver may automatically translate it into the meaning of requesting to send data. Similarly, confirmation data, start data, end data, confirmation end data, and other data with specific names in this document are understood in the same way, and will not be described again here.

Preferably, in any of the above embodiments, the selected path is specifically as follows:

in a case where one of the first satellites only communicates with one of the second satellites, a path in which the first satellite is communicated with the second satellite is used as the selected path;

in a case where one of the first satellites communicates with the plurality of second satellites:

when the plurality of second satellites transmits interrogation beams non-simultaneously, a path in which the first satellite is communicated with the second satellite corresponding to an order in which the interrogation beams are received is used as the selected path; and when the plurality of second satellites transmits the interrogation beams simultaneously, a path in which the first satellite is communicated with the second satellite corresponding to the beam with the highest energy among the interrogation beams is used as a selected tentative path, and a path score of the tentative path is compared with scores of paths in which the first satellite is communicated with the remaining second satellites to determine whether the path score of the tentative path is highest to generate a determination result, if the determination result is yes, the tentative path is used as the selected path, and if the determination result is no, the energy of the interrogation beam of the path with a higher path score than the tentative path is adjusted lower, so that the determination result is yes, and at this time, the tentative path is used as the selected path; and in the case where the plurality of first satellites communicates with one of second satellites:

when only one first satellite contains the data to be sent, a path in which the first satellite containing the data to be sent is communicated with the second satellite is used as the selected path; and when there is a plurality of first satellites containing the data to be sent, the second satellite sends confirmation data with a satellite marker to the plurality of first satellites containing the data to be sent, the first satellite that matches the satellite marker communicates with the second satellite, and at this time, a path in which the first satellite that matches the satellite marker is communicated with the second satellite is used as the selected path; after the period of one interrogation time ends, the second satellite sends silent data to the first satellite that matches the satellite marker; the process of using the path in which the first satellite that matches the satellite marker is communicated with the second satellite as the selected path is repeated until all the first satellites that contain the data to be sent have communicated with the second satellite.

Figure 2:
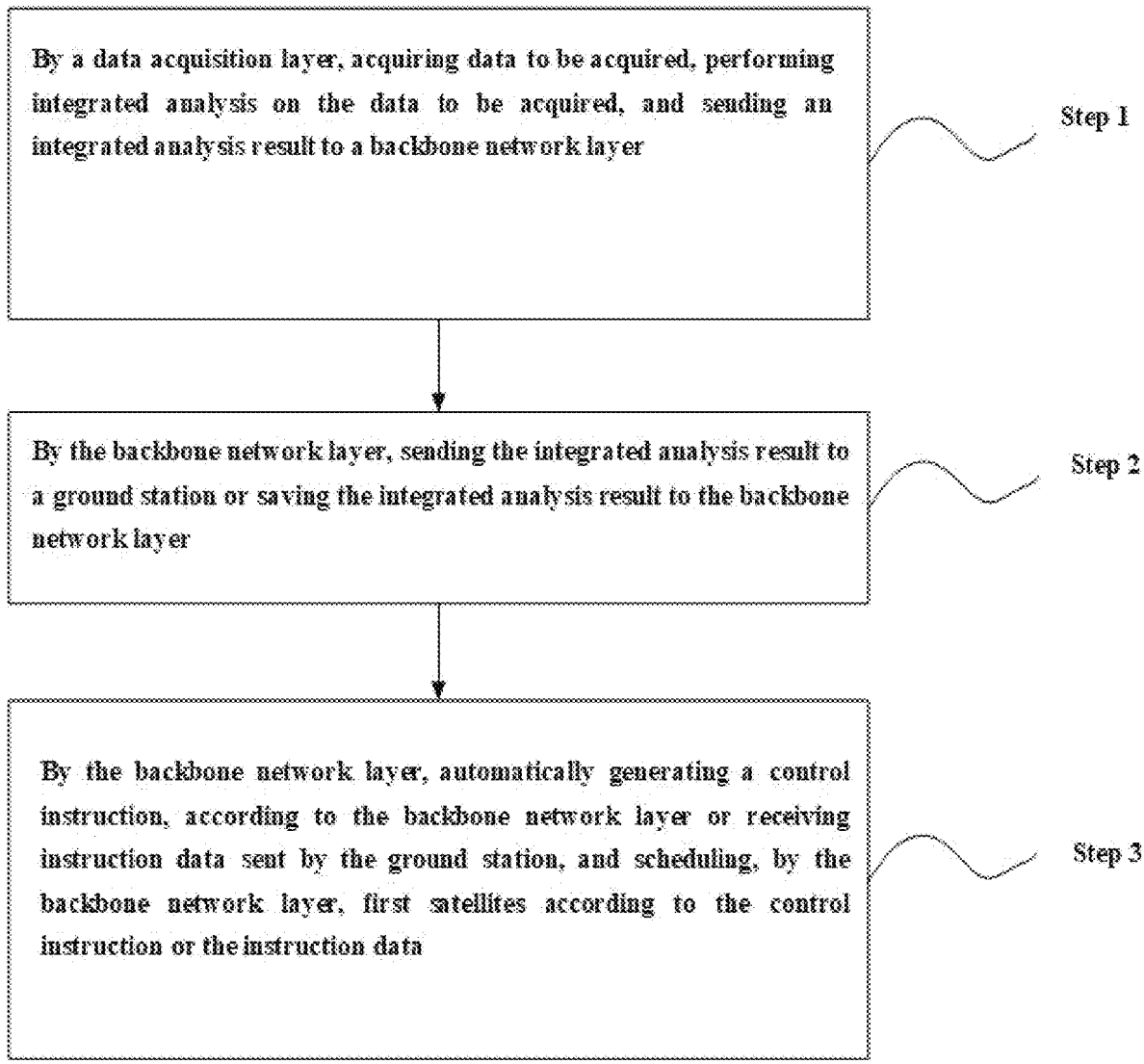
FIG. 2 is a schematic flowchart of a modulated retro reflector-based satellite network communication method according to an embodiment of the present invention.

As shown in FIG. 2, an MRR-based satellite network communication method includes:

step 1, by a data acquisition layer, acquiring data to be acquired, performing integrated analysis on the data to be acquired; and sending an integrated analysis result to a backbone network layer;

step 2, by the backbone network layer, sending the integrated analysis result to a ground station or saving the integrated analysis result to the backbone network layer; and step 3, by the backbone network layer, automatically generating a control instruction according to the backbone network layer or receiving instruction data sent by the ground station, and scheduling, by the backbone network layer, the first satellites according to the control instruction or the instruction data.

In some possible embodiments, in order to enable laser communication on micro-satellites, it needs to reduce an SWaP value. For this purpose, the MRR may be used, which may eliminate one PAT system, so that the satellite's SWaP value is greatly reduced, thereby being suitable for laser communication of the micro-satellites. As the MRR can only transmit information passively and it is usually impossible to achieve direct communication between two MRRs, a satellite network architecture is proposed, i.e., the communication subnet 11, which consists of the backbone network layer 112 and the data acquisition layer 111. The MRRs are installed on the satellites in the data acquisition layer 111, cannot communicate directly with one another, but may communicate with one another through other nodes in the network.

It should be noted that the control instruction or the instruction data may include, but is not limited to, detection of the first satellites and the second satellites.

Preferably, in any of the above embodiments, a networking process for the communication subnet 11 is as follows.

Any two or more satellites that allow communication are formed into the communication subnet 11 and a routing table and a polling list are generated, the polling list being saved to the second satellite; and after networking, each of the first satellites is connected to at least one second satellite and a specific connection process is as follows:

according to satellite location information in the routing table, any first satellite is connected to the second satellite which satisfies a first condition: a distance between this second satellite and the first satellite to which the connection is to be confirmed is less than a threshold; and if there is no second satellite satisfying the first condition, according to the satellite location information in the routing table, any first satellite is connected to the second satellite which satisfies a second condition: a distance between this second satellite and the first satellite to which the connection is to be confirmed is minimum.

Preferably, in any of the above embodiments, the networking process for the communication subnet 11 further includes the joining process of a new satellite, which is specifically as follows:

any satellite in the communication subnet 11 receives an access request of the new satellite and updates basic information of the new satellite to the routing table and the polling list to complete the joining of the new satellite; or the communication subnet 11 receives an access request of the new satellite issued by the ground station 12, and updates the routing table and the polling list according to information of the access request, and any satellite in the communication subnet 11 sends an access signal to the new satellite to complete the joining of the new satellite.

Preferably, in any of the above embodiments, the polling list is specifically configured to:

unify the time when the second satellites send interrogation beams to the first satellites, and within the interrogation time, data interaction is performed between the backbone network layer 112 and the data acquisition layer 111, wherein the data interaction satisfies: an interaction time is less than the period of one interrogation time; and the data interaction performed between the backbone network layer 112 and the data acquisition layer 111 includes:

one-way communication of the second satellite to the first satellite, one-way communication of the first satellite to the second satellite, communication between the first satellites and communication between the second satellites.

Preferably, in any of the above embodiments, the one-way communication of the second satellite to the first satellite is specifically as follows:

based on a selected path, the second satellite sends a modulated light signal with information to the first satellite within the interrogation time.

Preferably, in any of the above embodiments, the one-way communication of the first satellite to the second satellite is specifically as follows:

based on a selected path, the second satellite transmits an interrogation beam with unmodulated data to the first satellite, the interrogation beam is received by the modulated retro reflector on the first satellite; the first satellite modulates a specific piece of data with the interrogation beam as request data, and feeds back the request data to the second satellite with the modulated retro reflector; after receiving the request data, the second satellite returns confirmation data and continues to transmit the interrogation beam to the first satellite; after receiving the confirmation data, the first satellite transmits a piece of start data with the interrogation beam and then sends, and sends modulated data to be sent with the modulated retro reflector; after the data to be sent is sent completely, the first satellite transmits a piece of end data with the interrogation beam; after receiving the end data, the second satellite sends confirmation end data to the first satellite; and after receiving a feedback from the first satellite confirming that the data has been ended, the second satellite stops transmitting the interrogation beam to the first satellite.

Preferably, in any of the above embodiments, the selected path is specifically as follows:

in a case where one of the first satellites only communicates with one of the second satellites, a path in which the first satellite is communicated with the second satellite is used as the selected path;

in a case where one of the first satellites communicates with the plurality of second satellites:

when the plurality of second satellites transmits interrogation beams non-simultaneously, a path in which the first satellite is communicated with the second satellite corresponding to an order in which the interrogation beams are received is used as the selected path; and when the plurality of second satellites transmits the interrogation beams simultaneously, a path in which the first satellite is communicated with the second satellite corresponding to the beam with the highest energy among the interrogation beams is used as a selected tentative path, and a path score of the tentative path is compared with scores of paths in which the first satellite is communicated with the remaining second satellites to determine whether the path score of the tentative path is highest to generate a determination result; if the determination result is yes, the tentative path is used as the selected path, and if the determination result is no, the energy of the interrogation beam of the path with a higher path score than the tentative path is adjusted lower, so that the determination result is yes, and at this time, the tentative path is used as the selected path; and in the case where the plurality of first satellites communicates with one of second satellites:

when only one first satellite contains the data to be sent, a path in which the first satellite containing the data to be sent is communicated with the second satellite is used as the selected path;

when there is a plurality of first satellites containing the data to be sent, the second satellite sends confirmation data with a satellite marker to the plurality of first satellites containing the data to be sent, the first satellite that matches the satellite marker communicates with the second satellite, and at this time, a path in which the first satellite that matches the satellite marker is communicated with the second satellite is used as the selected path; after the period of one interrogation time ends, the second satellite sends silent data to the first satellite that matches the satellite marker, the process of using the path in which the first satellite that matches the satellite marker is communicated with the second satellite as the selected path is repeated until all the first satellites that contain the data to be sent have communicated with the second satellite.

Another technical solution of the present invention for solving the above technical problem is as follows: a storage medium storing instructions therein, wherein when a computer reads the instructions, the computer is caused to execute a modulated retro reflector-based satellite network communication method as described in any one of the above.

In some possible embodiments, in order to enable laser communication on micro-satellites, it needs to reduce an SWaP value. For this purpose, the MRR may be used, which may eliminate one PAT system, so that the satellite's SWaP value is greatly reduced, thereby being suitable for laser communication of the micro-satellites. As the MRR can only transmit information passively and it is usually impossible to achieve direct communication between two MRRs, a satellite network architecture is proposed, i.e., the communication subnet 11, which consists of the backbone network layer 112 and the data acquisition layer 111. The MRRs are installed on the satellites in the data acquisition layer 111, cannot communicate directly with one another, but may communicate with one another through other nodes in the network.

Still another technical solution of the present invention for solving the above technical problem is as follows: an electronic device including the above storage medium, and a processor that executes the instructions in the above storage medium.

In some possible embodiments, in order to enable laser communication on micro-satellites, it needs to reduce an SWaP value. For this purpose, the MRR may be used, which may eliminate one PAT system, so that the satellite's SWaP value is greatly reduced, thereby being suitable for laser communication of the micro-satellites. As the MRR can only transmit information passively and it is usually impossible to achieve direct communication between two MRRs, a satellite network architecture is proposed, i.e., the communication subnet 11, which consists of the backbone network layer 112 and the data acquisition layer 111. The MRRs are installed on the satellites in the data acquisition layer 111, cannot communicate directly with one another, but may communicate with one another through other nodes in the network.

Readers should understand that in the description of the present invention, the reference terms such as "one embodiment", "some embodiments", "an example", "a particular example", "some examples" or the like means that particular features, structures, materials or characteristics described in combination with the embodiment(s) or example(s) are included in at least one embodiment or example of the present invention. In the present description, the illustrative expressions of the above terms do not necessarily refer to the same embodiments or examples. Moreover, the particular features, structures, materials or characteristics described may be combined in any one or more embodiments or examples in any suitable manner. In addition, in the absence of mutual contradiction, different embodiments or examples described and features of the different embodiments or examples in this description may be combined by those skilled in the art.

In several embodiments provided by the present application, it should be understood that the disclosed apparatuses and methods may be implemented by other means. For example, the method embodiments described above are merely schematic. For example, the division of steps may be only a logical functional division. There may be other division modes during actual implementation. For example, multiple steps may be combined or integrated into another step, or some features may be ignored or not executed.

The above method, if implemented in the form of a software functional unit and sold or used as a standalone product, may be stored in a computer-readable storage medium. Based on such understanding, the technical solution of the present invention in essence, or a part that contributes to the prior art, or all or part of the technical solution, may be embodied in the form of a software product. The computer software product is stored in a storage medium and includes a plurality of instructions to cause a computer device (which may be a personal computer, a server, a network device or the like) to execute all or part of the steps of the method described in the embodiments of the present application.

The above description is merely specific embodiments of the present invention, but the protection scope of the present invention is not limited thereto. Any equivalent modification or replacement would be readily conceived by any person skilled in the art within the scope of the technology disclosed in the present invention and should be within the scope of protection of the present invention. Therefore, the protection scope of the present invention shall be subject to the protection scope defined by the claims.

What is claimed is:

1. A modulated retro reflector-based satellite network communication system, comprising:
   a communication subnet and a ground station, wherein
   the communication subnet comprises a data acquisition layer and a backbone network layer, wherein
   the data acquisition layer comprises a plurality of first satellites, and is configured to acquire data to be acquired through at least one first satellite, perform integrated analysis on the data to be acquired, and send an integrated analysis result to the backbone network layer, and
   a modulated retro reflector is installed on the first satellite;
   the backbone network layer comprises a plurality of second satellites, and is configured to receive a control instruction sent by the ground station through at least one second satellite, schedule the first satellites based on the control instruction, and send the integrated analysis result to the ground station, and
   a modulated retro reflector and a PAT system, or the PAT system, are/is mounted on the second satellite;
   the ground station is configured to generate the control instruction, send the same to the backbone network layer, detect the first satellites and the second satellites, and receive the integrated analysis result;
   a networking process for the communication subnet is as follows:
   any two or more satellites that allow communication are formed into the communication subnet and a routing table and a polling list are generated, the polling list being saved to the second satellite; and
   after networking, each of the first satellites is connected to at least one second satellite and a specific connection process is as follows:
   according to satellite location information in the routing table, any first satellite is connected to the second satellite which satisfies a first condition: a distance between this second satellite and the first satellite to which the connection is to be confirmed is less than a threshold; and
   if there is no second satellite satisfying the first condition, according to the satellite location information in the routing table, any first satellite is connected to the second satellite which satisfies a second condition: a distance between this second satellite and the first satellite to which the connection is to be confirmed is minimum.

2. The modulated retro reflector-based satellite network communication system according to claim 1, wherein the networking process of the communication subnet further comprises a joining process of a new satellite, which is as follows:
   any satellite in the communication subnet receives an access request of the new satellite and updates basic information of the new satellite to the routing table and the polling list to complete the joining of the new satellite; or
   the communication subnet receives an access request of the new satellite issued by the ground station, and updates the routing table and the polling list according to information of the access request, and any satellite in the communication subnet sends an access signal to the new satellite to complete the joining of the new satellite.

3. The modulated retro reflector-based satellite network communication system according to claim 1, wherein the polling list is configured to:
  unify time when the second satellites send interrogation beams to the first satellites, and within an interrogation time, data interaction is performed between the backbone network layer and the data acquisition layer, and the data interaction satisfies: an interaction time is less than a period of the interrogation time; and
  the data interaction performed between the backbone network layer and the data acquisition layer comprises:
  one-way communication of the second satellite to the first satellite, one-way communication of the first satellite to the second satellite, communication between the first satellites and communication between the first satellites.

4. The modulated retro reflector-based satellite network communication system according to claim 3, wherein the one-way communication of the second satellite to the first satellite is as follows:
  based on a selected path, the second satellite sends a modulated light signal with information to the first satellite within the interrogation time.

5. The modulated retro reflector-based satellite network communication system according to claim 4, wherein the one-way communication of the first satellite to the second satellite is as follows:
  based on the selected path, the second satellite transmits an interrogation beam with unmodulated data to the first satellite and the interrogation beam is received by the modulated retro reflector on the first satellite; the first satellite modulates a specific piece of data with the interrogation beam as request data, and feeds back the request data to the second satellite with the modulated retro reflector; after receiving the request data, the second satellite returns confirmation data and continues to transmit the interrogation beam to the first satellite; after receiving the confirmation data, the first satellite transmits a piece of start data with the interrogation beam and then sends, with the modulated retro reflector, modulated data to be sent; after the data to be sent is sent completely, the first satellite transmits a piece of end data with the interrogation beam; and after receiving the end data, the second satellite sends confirmation end data to the first satellite, and after receiving a feedback from the first satellite confirming that the data has been ended, the second satellite stops transmitting the interrogation beam to the first satellite.

6. The modulated retro reflector-based satellite network communication system according to claim 5, wherein the selected path is as follows:
  in a case where one of the first satellites only communicates with one of the second satellites, a path in which the first satellite is communicated with the second satellite is used as the selected path;
  in a case where one of the first satellites communicates with the plurality of second satellites:
  when the plurality of second satellites transmits interrogation beams non-simultaneously, a path in which the first satellite is communicated with the second satellite corresponding to an order in which the interrogation beams are received is used as the selected path; and
  when the plurality of second satellites transmits the interrogation beams simultaneously, a path in which the first satellite is communicated with the second satellite corresponding to the beam with the highest energy among the interrogation beams is used as a selected tentative path, a path score of the tentative path is compared with scores of paths in which the first satellite is communicated with the remaining second satellites to determine whether the path score of the tentative path is highest to generate a determination result, if the determination result is yes, the tentative path is used as the selected path, and if the determination result is no, the energy of the interrogation beam of the path with a higher path score than the tentative path is adjusted lower, so that the determination result is yes, and at this time, the tentative path is used as the selected path; and
  in the case where the plurality of first satellites communicates with one of the second satellites:
  when only one first satellite contains data to be sent, a path in which the first satellite containing the data to be sent is communicated with the second satellite is used as the selected path; and
  when there is a plurality of first satellites containing the data to be sent, the second satellite sends confirmation data with a satellite marker to the plurality of first satellites containing the data to be sent, the first satellite that matches the satellite marker communicates with the second satellite, and at this time, a path in which the first satellite that matches the satellite marker is communicated with the second satellite is used as the selected path, after the period of one interrogation time ends, the second satellite sends silent data to the first satellite that matches the satellite marker; and the process of using the path in which the first satellite that matches the satellite marker is communicated with the second satellite as the selected path is repeated until all the first satellites that contain the data to be sent have communicated with the second satellite.

7. A modulated retro reflector-based satellite network communication method, comprising:
  step 1, by a data acquisition layer, acquiring data to be acquired, performing integrated analysis on the data to be acquired, and sending an integrated analysis result to a backbone network layer;
  step 2, by the backbone network layer, sending the integrated analysis result to a ground station or saving the integrated analysis result to the backbone network layer; and
  step 3, by the backbone network layer, automatically generating a control instruction according to the backbone network layer or receiving instruction data sent by the ground station, and scheduling, by the backbone network layer, first satellites according to the control instruction or the instruction data,
  wherein the modulated retro reflector-based satellite network communication method is performed using a modulated retro reflector-based satellite network communication system, including:
  a communication subnet and a ground station, wherein the communication subnet comprises a data acquisition layer and a backbone network layer, wherein
  the data acquisition layer comprises a plurality of first satellites, and is configured to acquire data to be acquired through at least one first satellite, perform integrated analysis on the data to be acquired, and send an integrated analysis result to the backbone network layer, and a modulated retro reflector is installed on the first satellite;

the backbone network layer comprises a plurality of second satellites, and is configured to receive a control instruction sent by the ground station through at least one second satellite, schedule the first satellites based on the control instruction, and send the integrated analysis result to the ground station, and a modulated retro reflector and a PAT system, or the PAT system, are/is mounted on the second satellite;

the ground station is configured to generate the control instruction, send the same to the backbone network layer, detect the first satellites and the second satellites, and receive the integrated analysis result;

a networking process for the communication subnet is as follows:

any two or more satellites that allow communication are formed into the communication subnet and a routing table and a polling list are generated, the polling list being saved to the second satellite; and after networking, each of the first satellites is connected to at least one second satellite and a specific connection process is as follows:

according to satellite location information in the routing table, any first satellite is connected to the second satellite which satisfies a first condition: a distance between this second satellite and the first satellite to which the connection is to be confirmed is less than a threshold; and if there is no second satellite satisfying the first condition, according to the satellite location information in the routing table, any first satellite is connected to the second satellite which satisfies a second condition: a distance between this second satellite and the first satellite to which the connection is to be confirmed is minimum.

8. The modulated retro reflector-based satellite network communication method according to claim 7, wherein in the modulated retro reflector-based satellite network communication system, the networking process of the communication subnet further comprises a joining process of a new satellite, which is as follows:

any satellite in the communication subnet receives an access request of the new satellite and updates basic information of the new satellite to the routing table and the polling list to complete the joining of the new satellite; or the communication subnet receives an access request of the new satellite issued by the ground station, and updates the routing table and the polling list according to information of the access request, and any satellite in the communication subnet sends an access signal to the new satellite to complete the joining of the new satellite.

9. The modulated retro reflector-based satellite network communication method according to claim 7, wherein in the modulated retro reflector-based satellite network communication system, the polling list is configured to:

unify time when the second satellites send interrogation beams to the first satellites, and within an interrogation time, data interaction is performed between the backbone network layer and the data acquisition layer, and the data interaction satisfies: an interaction time is less than a period of the interrogation time; and the data interaction performed between the backbone network layer and the data acquisition layer comprises: one-way communication of the second satellite to the first satellite, one-way communication of the first satellite to the second satellite, communication between the first satellites and communication between the first satellites.

10. The modulated retro reflector-based satellite network communication method according to claim 9, wherein in the modulated retro reflector-based satellite network communication system, the one-way communication of the second satellite to the first satellite is as follows:

based on a selected path, the second satellite sends a modulated light signal with information to the first satellite within the interrogation time.

11. The modulated retro reflector-based satellite network communication method according to claim 10, wherein in the modulated retro reflector-based satellite network communication system, the one-way communication of the first satellite to the second satellite is as follows:

based on the selected path, the second satellite transmits an interrogation beam with unmodulated data to the first satellite and the interrogation beam is received by the modulated retro reflector on the first satellite; the first satellite modulates a specific piece of data with the interrogation beam as request data, and feeds back the request data to the second satellite with the modulated retro reflector; after receiving the request data, the second satellite returns confirmation data and continues to transmit the interrogation beam to the first satellite; after receiving the confirmation data, the first satellite transmits a piece of start data with the interrogation beam and then sends, with the modulated retro reflector, modulated data to be sent; after the data to be sent is sent completely, the first satellite transmits a piece of end data with the interrogation beam; and after receiving the end data, the second satellite sends confirmation end data to the first satellite, and after receiving a feedback from the first satellite confirming that the data has been ended, the second satellite stops transmitting the interrogation beam to the first satellite.

12. The modulated retro reflector-based satellite network communication method according to claim 11, wherein in the modulated retro reflector-based satellite network communication system, the selected path is as follows:

in a case where one of the first satellites only communicates with one of the second satellites, a path in which the first satellite is communicated with the second satellite is used as the selected path;

in a case where one of the first satellites communicates with the plurality of second satellites:

when the plurality of second satellites transmits interrogation beams non-simultaneously, a path in which the first satellite is communicated with the second satellite corresponding to an order in which the interrogation beams are received is used as the selected path; and when the plurality of second satellites transmits the interrogation beams simultaneously, a path in which the first satellite is communicated with the second satellite corresponding to the beam with the highest energy among the interrogation beams is used as a selected tentative path, a path score of the tentative path is compared with scores of paths in which the first satellite is communicated with the remaining second satellites to determine whether the path score of the tentative path is highest to generate a determination result, if the determination result is yes, the tentative path is used as the selected path, and if the determination result is no, the energy of the interrogation beam of the path with a higher path score than the tentative path is adjusted lower, so that the determination result is yes, and at this time, the tentative path is used as the selected path; and in the case where the plurality of first satellites communicates with one of the second satellites:

when only one first satellite contains data to be sent, a path in which the first satellite containing the data to be sent is communicated with the second satellite is used as the selected path; and when there is a plurality of first satellites containing the data to be sent, the second satellite sends confirmation data with a satellite marker to the plurality of first satellites containing the data to be sent, the first satellite that matches the satellite marker communicates with the second satellite, and at this time, a path in which the first satellite that matches the satellite marker is communicated with the second satellite is used as the selected path, after the period of one interrogation time ends, the second satellite sends silent data to the first satellite that matches the satellite marker; and the process of using the path in which the first satellite that matches the satellite marker is communicated with the second satellite as the selected path is repeated until all the first satellites that contain the data to be sent have communicated with the second satellite.

\* \* \* \* \*